(12) United States Patent
Manoff et al.

(10) Patent No.: US 10,831,363 B2
(45) Date of Patent: *Nov. 10, 2020

(54) CONTENT MANIPULATION USING SWIPE GESTURE RECOGNITION TECHNOLOGY

(71) Applicant: SoMo Audience Corp., Summit, NJ (US)

(72) Inventors: Robert S. Manoff, Livingston, NJ (US); Todd Houck, Clarksboro, NJ (US); Jesse D. Squire, Kirkland, WA (US); Caleb K. Shay, Philadelphia, PA (US)

(73) Assignee: SWIPETHRU LLC, Summit, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,459

(22) Filed: Aug. 29, 2018

(65) Prior Publication Data

US 2019/0018566 A1   Jan. 17, 2019

Related U.S. Application Data

(63) Continuation of application No. 15/077,535, filed on Mar. 22, 2016, now Pat. No. 10,089,003, which is a
(Continued)

(51) Int. Cl.
*G06F 3/0488* (2013.01)
*G06F 3/01* (2006.01)
(Continued)

(52) U.S. Cl.
CPC ............ *G06F 3/0488* (2013.01); *G06F 3/017* (2013.01); *G06F 3/04842* (2013.01);
(Continued)

(58) Field of Classification Search
CPC ............... G06F 3/04883; G06F 3/0488; G06F 3/04842; G06Q 30/0241; G06Q 30/0277
See application file for complete search history.

(56) References Cited

U.S. PATENT DOCUMENTS

| 7,047,503 B1 | 5/2006 | Parrish et al. |
| 7,900,225 B2 | 3/2011 | Lyon et al. |
| (Continued) | | |

FOREIGN PATENT DOCUMENTS

WO   2012/048007 A2   4/2012

OTHER PUBLICATIONS

"International Preliminary Report on Patentability (Chapter I)", dated Jun. 2, 2015 (Jun. 2, 2015), for International Application No. PCT/US2013/072186, 7pgs.
(Continued)

*Primary Examiner* — Justin S Lee
(74) *Attorney, Agent, or Firm* — Cozen O'Connor

(57) ABSTRACT

A method of manipulation of content provided by a hosting server using swipe gesture recognition on a user device having a touch input display. The method includes storing the content, combined with a swipe gesture recognition module to form a content package, on the hosting server. The swipe gesture recognition module is associated with at least one displayable content element of the content. The method further includes receiving, at the hosting server, a request for the content package from the user device and transmitting the content package from the hosting server to the user device for display by an application running on the user device. A defined action is applied to the at least one displayable content element if it is determined that a swipe gesture has occurred on the at least one displayable content element.

12 Claims, 5 Drawing Sheets

Related U.S. Application Data continuation of application No. 13/932,898, filed on Jul. 1, 2013, now abandoned.

(60) Provisional application No. 61/730,899, filed on Nov. 28, 2012.

(51) Int. Cl.
*G06F 3/0484* (2013.01)
*G06F 40/14* (2020.01)
*G06F 40/274* (2020.01)
*G06Q 30/02* (2012.01)

(52) U.S. Cl.
CPC .......... *G06F 3/04883* (2013.01); *G06F 40/14* (2020.01); *G06F 40/274* (2020.01); *G06Q 30/0241* (2013.01)

(56) References Cited

U.S. PATENT DOCUMENTS

| | | | |
|---|---|---|---|
| 7,941,766 B2 | 5/2011 | Parrish et al. | |
| 7,996,422 B2 | 8/2011 | Shahraray et al. | |
| 8,046,721 B2 | 10/2011 | Chaudhri et al. | |
| 8,059,101 B2 | 11/2011 | Westerman et al. | |
| 8,185,923 B2 | 5/2012 | Slaney et al. | |
| 8,261,306 B2 | 9/2012 | Dimitrova et al. | |
| 8,432,368 B2 | 4/2013 | Momeyer et al. | |
| 8,487,897 B1 | 7/2013 | Hsieh | |
| 8,719,734 B2 | 5/2014 | Mun et al. | |
| 8,760,428 B2 | 6/2014 | Hsieh | |
| 8,782,546 B2 | 7/2014 | Haussila et al. | |
| 8,797,192 B2 | 8/2014 | Maw | |
| 8,839,155 B2 | 9/2014 | Ording | |
| 8,856,690 B2 | 10/2014 | Reeves et al. | |
| 2007/0150842 A1* | 6/2007 | Chaudhri | G06F 3/04883 715/863 |
| 2008/0122796 A1* | 5/2008 | Jobs | G06F 3/04883 345/173 |
| 2008/0316183 A1* | 12/2008 | Westerman | G06F 3/0416 345/173 |
| 2009/0225037 A1* | 9/2009 | Williamson | G06F 3/04886 345/173 |
| 2009/0225038 A1* | 9/2009 | Bolsinga | G06F 3/04883 345/173 |
| 2009/0278806 A1* | 11/2009 | Duarte | G06F 3/0416 345/173 |
| 2009/0319181 A1* | 12/2009 | Khosravy | G01C 21/20 701/532 |
| 2010/0235118 A1 | 9/2010 | Moore et al. | |
| 2011/0066985 A1 | 3/2011 | Corbin et al. | |
| 2011/0078558 A1* | 3/2011 | Bao | G06Q 30/02 715/234 |
| 2011/0179387 A1* | 7/2011 | Shaffer | G06F 3/04883 715/835 |
| 2011/0181526 A1* | 7/2011 | Shaffer | G06F 9/451 345/173 |
| 2011/0258049 A1* | 10/2011 | Ramer | G06Q 30/02 705/14.66 |
| 2011/0288913 A1* | 11/2011 | Waylonis | G06Q 30/02 705/14.4 |
| 2012/0092277 A1* | 4/2012 | Momchilov | G06F 3/038 345/173 |
| 2012/0130822 A1* | 5/2012 | Patwa | G06Q 30/0273 705/14.69 |
| 2012/0131454 A1* | 5/2012 | Shah | G06F 3/04883 715/702 |
| 2012/0131497 A1 | 5/2012 | Jitkoff | |
| 2012/0158629 A1* | 6/2012 | Hinckley | G06F 3/038 706/15 |
| 2012/0254804 A1* | 10/2012 | Sheha | G06Q 30/02 715/834 |
| 2012/0284673 A1 | 11/2012 | Lamb et al. | |
| 2012/0311509 A1 | 12/2012 | Maggiotto et al. | |
| 2013/0074014 A1* | 3/2013 | Ouyang | G06F 3/0488 715/863 |
| 2013/0086532 A1* | 4/2013 | Shakespeare | G06F 3/0416 715/863 |
| 2013/0275924 A1 | 10/2013 | Weinberg et al. | |
| 2014/0007018 A1 | 1/2014 | Ben Shitrit et al. | |
| 2014/0026105 A1 | 1/2014 | Erksson et al. | |
| 2014/0075373 A1 | 3/2014 | Jitkoff et al. | |
| 2014/0149893 A1* | 5/2014 | Raichelgauz | G06F 17/2235 715/760 |

OTHER PUBLICATIONS

"Communication: Extended Supplemental European Search Report", dated Jul. 4, 2016 (Jul. 4, 2016), European Patent Office, for European Application No. 13858848.8-1959 / 2926227 PCT/US2013072186, 8pgs.

"Japanese First Office Action", dated Sep. 14, 2017, for Japanese Application No. 2015-545425, 4pgs.

"English-language Translation of Japanese First Office Action", dated Sep. 14, 2017, for Japanese Application No. 2015-545425, 3pgs.

"Chinese First Office Action", dated Apr. 24, 2017, for Chinese Application No. 23180071413.2, 5pgs.

"English-language Translation of Chinese First Office Action", dated Apr. 24, 2017, for Chinese Application No. 23180071413.2, 6pgs.

The Crazy Chimp, "Confining a swipe gesture to a certain area (iPhone)", Oct. 2, 2011, Stack Overflow, (pp. 1-3, 3 total pages).

* cited by examiner

CONTENT MANIPULATION USING SWIPE GESTURE RECOGNITION TECHNOLOGY

CROSS-REFERENCE TO RELATED APPLICATIONS

This is a continuation of U.S. patent application Ser. No. 15/077,535, filed Mar. 22, 2016, which is a continuation of U.S. patent application Ser. No. 13/932,898, filed Jul. 1, 2013, which claims priority to U.S. provisional patent application No. 61/730,899, filed Nov. 28, 2012, entitled "CONTENT MANIPULATION USING SWIPE GESTURE RECOGNITION TECHNOLOGY." The entire content of all of these applications is incorporated herein by reference.

FIELD OF THE INVENTION

The disclosed embodiments are directed to a content manipulation using swipe gesture recognition technology. More specifically, the disclosed embodiments are directed to systems and methods for manipulation of Internet-based content provided by a hosting server using swipe gesture recognition technology on a user device.

BACKGROUND OF THE INVENTION

Touchscreen-based user computing devices, such as smartphones, tablets, e-readers, touch-enabled laptops, and touch-enabled desktop computers, are commonly used to request content from servers, via the Internet. Such content may include an advertisement, or other type of display window, which is overlaid on the displayed content until a particular portion of the advertisement is touched by the user. The portion which must be touched to close the advertisement may be a small "X" in a corner of the advertisement.

On relatively small screens, particularly smartphone screens, it is often difficult for the user to accurately touch the designated portion of the screen to close the advertisement. This may result in the user unintentionally touching an active portion of the advertisement instead of the close "button," which may, in turn, result in an undesired activation of an animation or even an undesired navigation to a different webpage. This can be a very frustrating and annoying experience for the user.

Such undesired activations of an advertiser's webpage can increase the advertiser's costs, because the advertisement may be paid for based on a particular cost-per-click (CPC). Therefore, an advertiser purchasing advertisements on mobile devices on a CPC basis may find that they are getting a very high click-through rate (CTR) but a low return on investment (ROI) due to accidental click-throughs. This may annoy current and potential customers and may result in a negative brand perception, which is a significant concern for large brands.

SUMMARY OF THE INVENTION

The disclosed embodiments provide a system, a method, and processor instructions for implementing swipe gesture recognition technology to manipulate Internet-based content provided by a hosting server to a user device.

In the disclosed system and method, a user may have a computing device, such as, for example, a mobile device. The mobile device could be, e.g., a mobile phone, a tablet, a household appliance which is running an embedded mobile piece of software, such as mobile browser. The browser may make a request for a piece of content. This content is typically hosted on a web page and is accessed via the Internet. In such a case, a web page is actually making a request from the device to a server that hosts the content. The content may include an advertisement and the behaviors that apply to that advertisement. When the server receives a content request, it provides a "package" of the content, the advertisement, and certain related information, such swipe gesture behaviors and technology packages that are needed to apply this related information to the requested content. Different types of advertisements may be bundled in different ways, and there may be different elements of the swipe gesture recognition technology as it gets assembled, specifically, with a particular piece of content. Once those decisions are made, the server sends the bundle, which contains at least the swipe gesture recognition technology pieces and the advertisement.

The advertisement may come from a server other than the content server (i.e., the hosting server). The content server may not have access to the advertisement itself. Rather, the content server may just receive enough information about the advertisement to allow the content server to determine how the swipe gesture recognition technology will be applied to the advertisement on the user's device.

In certain embodiments, the information relating to the advertisement which is received by the content server may be an identifier of the particular content package that it is looking to apply the swipe technology, e.g., a uniform resource locator (URL). The information may also include additional context data that would indicate how the advertisement is to be displayed on the user device, e.g., whether the advertisement is full screen or a window bar at the bottom of the page. The information received by the content server may include particular details of the type of presentation that is desired by the advertiser and how the advertisement is meant to react to detected swipe gestures. Alternatively, the advertiser may want only an indication that a swipe has occurred and may handle the response to the swipe in the software operating on the user device.

The information received by the content server relating to the advertisement provides a context in which the advertisement is to be displayed on the user device. The information describes the particular behaviors which are necessary from the swipe gesture recognition technology, whether the swipe technology needs to include presentation components, and, if so, which presentation components are necessary.

Once the package containing the content, advertising information, and swipe gesture recognition technology (e.g., in the form of a module of code) is assembled, it is delivered to the user device. The package may be, for example, in the form of client-type script, and this script makes decisions based on the information that is available at the user device level. Once the swipe gesture recognition technology is on the user device, it already knows where the advertising content is located and details regarding how the presentation is to be displayed on the user device. The display behavior is, thus, based on the package. Among other things, the swipe gesture recognition technology "crawls" through parts of the content page and finds the advertisement that it is meant to present/control. If the package needs to apply presentation components, it will do so that at this point. The swipe technology will also determine where it needs to start listening for the user's gestures in order to interpret them and decide whether the user meant to perform a swipe gesture or whether the user meant to perform some other type of operation, such as a click, drag or other gesture.

After the preparation described above has been done and all of the related decisions have been made, then the swipe gesture recognition technology is in a passive listening mode in which it waits for the user to touch the screen of the user device. Once the user touches the screen, if, for example, the touch is within the portions of the screen to which swipe gesture behavior is to be applied, then the system will attempt to interpret whether the touching should be deemed to be a swipe gesture.

Thus, when the user touches the screen, the swipe gesture recognition technology "wakes up" and starts trying to figure out what the user's intent is with respect to the touching action. The technology does this by applying behavioral analysis to the way the user's fingers move, e.g., how many fingers are in place, in which direction are they moving, for what length of time have they been moving, and various other criteria. After the user touches the screen, the swipe technology records the gestures and the interaction that the user has with the screen. Once the user removes his finger from the screen, then the swipe technology stops collecting the touch data and the analysis it has been doing in the background and starts to make decisions based on the touch data, e.g., touch location and time data.

The swipe gesture recognition technology analyzes the touching actions which the user performs with his finger on the screen and determines whether these actions constitute a swipe gesture of the sort the system is configured to look for and react to. If the system determines that the touching actions do not amount to the swipe gesture it is seeking, then the system may go back into a passive "listening" mode in which it awaits further touching actions.

If the swipe gesture recognition technology detects the particular swipe gestures for which it is "listening," then it will take different actions depending on the particular nature of the package installed on the user device. In a general case, if the system detects a bona fide swipe gesture, then it will signal this to any application or entity which happens to be listening to it. In certain embodiments, the swipe gesture recognition technology may also implement the user interface on the user device. In such a case, the system takes specific actions upon detection of the swipe gesture, such as, for example, making an overlaid displayable content element (e.g., an advertisement) disappear, which may be implemented by having the advertisement slide off the screen in an animated fashion. In embodiments in which the package contains the swipe gesture recognition technology without a display handling portion, then the portion of the package which asked for the swipe gesture recognition to be applied (e.g., a portion coded by an entity responsible for the advertising content) is then responsible for taking the appropriate actions based on a received indication that a swipe has occurred.

The disclosed embodiments provide systems and methods for listening to touch screen gestures, determining whether a detected gesture is appropriate, and then making sure that the system alerts the applications which need to know, so that, for example, an application can apply some type of action to a displayed advertisement. The application may, for example, close an overlaid advertisement, "swipe through" the advertisement to a different site identified by the advertisement, or cause the advertisement to initiate an animation or other executable element. For example, if the advertisement is for a soft drink, then the swipe gesture may cause an animation to execute which shows the beverage being poured into a glass. Thus, one aspect of the disclosed embodiments, is the ability to process all of the touchscreen data and to interpret how to perform user interaction.

In certain embodiments, after detection of the user touching the screen, the system starts "listening" for a swipe gesture. The system may determine whether the touch was on a defined area, e.g., on an advertisement, and may also determine whether the system is responsible for reacting to the swipe gesture or merely reporting it. If the touch was not on the advertisement, the system may stop listening and wait for the next detected touch. If the touch was on the advertisement, then the system will capture touch data, e.g., location and time, until the user stops touching the screen. At that point, the system determines whether the pattern of the user's interaction should be recognized as a swipe gesture. If not, the system goes back into a dormant state and waits for the next touch to occur. If it is determined, for example, that the gesture was long enough, was in the proper direction, did not deviate from its axis by too much, and had the proper magnitude, then the gesture would be deemed to be a bona fide swipe gesture. Based upon this determination, certain applications may be alerted and/or certain actions may be taken. Depending on the type of package that was delivered to the user device from the hosting server, the action taken might be the hiding of the advertisement or might be only the alerting of applications and then waiting for the next touch event.

In certain embodiments, swipe gesture recognition technology is attached to an advertisement, for example, and the resulting "package" is delivered to a user device. The package may include the content provider's (i.e., the entity responsible for the advertising content) script components as part of its content. When the content provider's script is executed on the user's device, the application, or other entity, using it has set up certain information to let the script know its context. There may be, for example, an element called "ABCD," which is the advertisement to which the swipe gesture recognition technology is to be attached. Inside element ABCD there may be a sub-element which has arrows (or other symbols) to indicate to the user that a swipe gesture is needed and that identify the element as the specific area that the system should monitor for swipe gestures. The specific area may turn a different color or provide some other sort of indication if the user touches the area instead of swiping the area. Certain embodiments are configured to detect swipe gestures in four different directions. The system will make sure that the swipe gesture is going left, right, up, or down. A diagonal swipe, on the other hand, would not be recognized.

The "package" in question for the core swipe gesture recognition technology may be a an HTML file having a combination of, e.g., text, image, and video content with a script block (e.g., JavaScript) embedded therein to act as an application programming interface (API). The swipe gesture behaviors may be defined in an external JavaScript library which is referenced by the advertising content using a standard <script> tag (with an "src" attribute which identifies the external library). The behaviors are applied to any HTML content by a block of script in the content which instructs the swipe library regarding to which parts of the page they should attach themselves, which options should be used for swipe gesture detection, and what should be done if a swipe gesture is detected.

In the case of a swipe advertisement which is configured to provide the user experience as well, the process works the same. The server hosting the advertising content may return a block of HTML content which contains the swipe gesture recognition "user experience." The combination of this HTML content and the advertisement content and requests and configures the swipe gesture behaviors in a manner similar to that discussed above (i.e., similar to the case in which the swipe advertisement is not configured to provide the user experience itself). Each of these user experience-providing swipe advertisements may be a previously-assembled and static block of HTML code, rather than something that reacts dynamically on an incoming request.

In certain embodiments, content, e.g., a web page, may have items across which it would like to track swipe gestures. It will make a request to the swipe script to be notified anytime the user performs a swipe gesture on the particular area. As the user is touching the screen, the swipe gesture recognition technology is in the background making decisions on the touch patterns to determine whether the user intended to make a swipe gesture. When a swipe gesture is detected, the system alerts any entity, e.g., an application or webpage HTML code, which has requested to be notified. In some embodiments, the entity requesting notification may be a third party which is just using the detected behaviors themselves. In some embodiments, the entity requesting notification is going to be a swipe advertisement package which provides some behavior support and user interface (UI) support for a third party applications.

In certain embodiments, all entities may be notified when a swipe gesture is detected. If a particular entity is one which has registered with the system and requested a comprehensive package, then the system will take certain actions in response to a detected swipe gesture, such as, for example, closing or clicking-through an advertisement. The system may perform whatever action is necessary upon detection of a swipe gesture and then "tear down" the listeners, i.e., touch detection monitors, because they are no longer necessary. This is done to avoid draining the user device or slowing down a session.

In other embodiments, the system may take the appropriate actions and continue to listen for swipe gestures. For example, there may be advertisements in which the swipe gesture is used to initiate an animation, such as an advertisement for a soft drink in which the user swipes across a soda bottle and the animation then shows the soft drink being poured out into a glass and releasing bubbles. The listeners may be left in place after the animation is initiated so that user can initiate the animation repeatedly.

In one aspect, the disclosed invention provides a method for manipulation of content provided by a hosting server using swipe gesture recognition on a user device having a touch input display. The method includes storing the content, combined with a swipe gesture recognition module to form a content package, on the hosting server, wherein the swipe gesture recognition module is associated with at least one displayable content element of the content. The method further includes receiving, at the hosting server, a request for the content package from the user device and transmitting the content package from the hosting server to the user device for display by an application running on the user device.

Further in regard to this aspect of the disclosed invention, the swipe gesture recognition module is configured to perform swipe gesture recognition when the at least one displayable content element is displayed on the user device. The swipe gesture recognition includes receiving touch input data from the touch input display of the user device. The swipe gesture recognition further includes accessing, using the swipe gesture recognition module, a swipe gesture determination module stored on the hosting server or a second server to analyze the touch input data to determine whether a swipe gesture has occurred on the at least one displayable content element. The swipe gesture recognition further includes applying a defined action to the at least one displayable content element if it is determined that a swipe gesture has occurred on the at least one displayable content element.

BRIEF DESCRIPTION OF THE DRAWINGS

The above and other objects and advantages of the disclosed subject matter will be apparent upon consideration of the following detailed description, taken in conjunction with accompanying drawings, in which like reference characters refer to like parts throughout, and in which.

DETAILED DESCRIPTION

Figure 1:
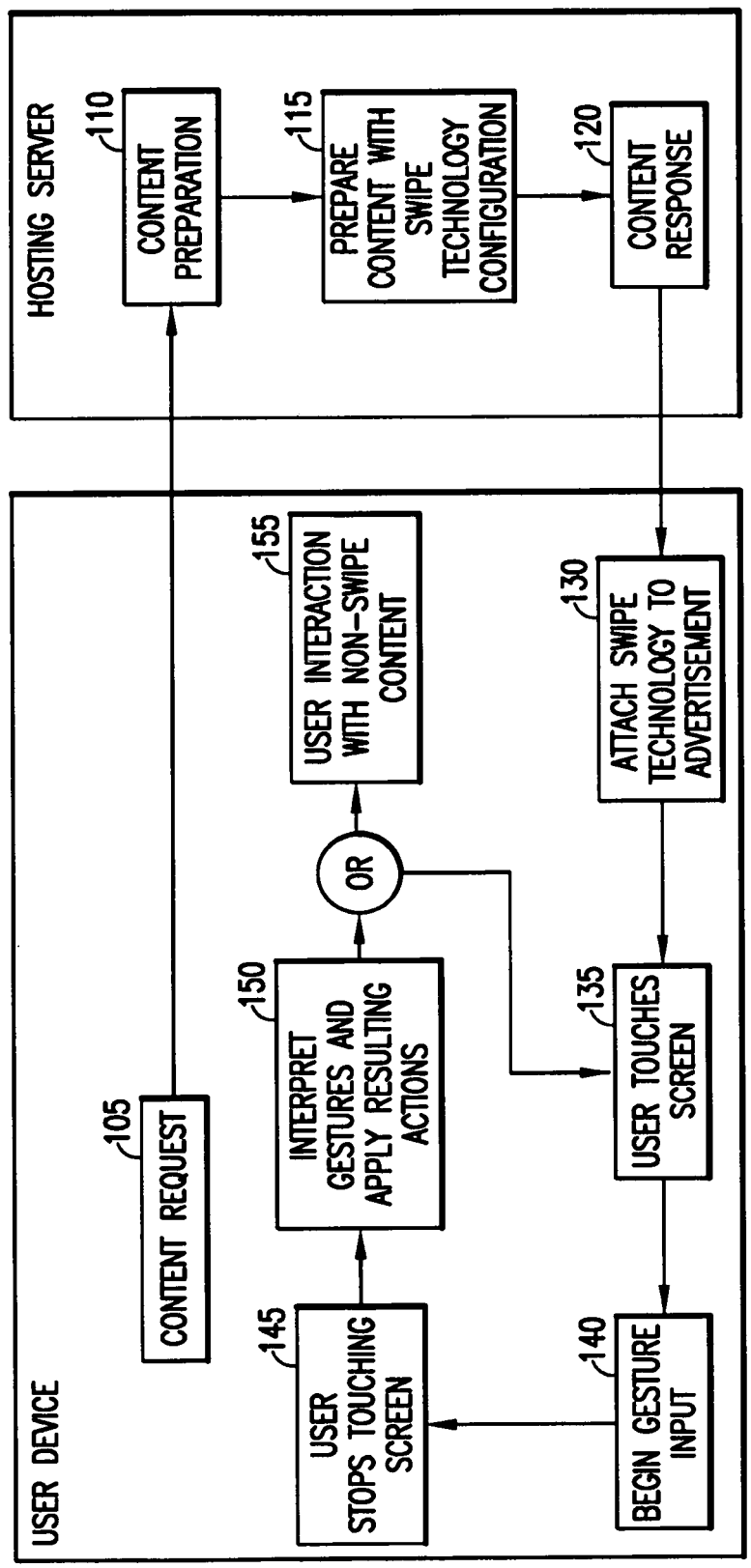
FIG. 1 is a flow chart of a method performed on a user device and a hosting sever, the user device implementing swipe gesture recognition technology to manipulate Internet-based content provided by the hosting server, in accordance with the disclosed invention.

FIG. 1 depicts a method for manipulating displayed content, which is performed on a user device and a hosting sever. The user device implements swipe gesture recognition technology to manipulate the content provided by the hosting server and displayed on the user device. The technology may include swipe gesture recognition software code in various forms, such as, for example, HTML-based scripts, compiled modules, plug-ins, applets, application program interface (API), etc.

The user device may be any type of user computing device, such as, for example, a mobile device (e.g., smartphone, tablet, etc.) or a personal computer or laptop with a touchscreen or trackpad-type element which allows a user to make swipe gestures. The user device initiates a content request 105 to a hosting server, e.g., via the Internet. The content request may be, for example, in the form of a uniform resource locator (URL) directed to a particular webpage.

The hosting server, upon receiving the content request, prepares the requested content 110 for transmission to the user device. The preparation of the content includes conventional aspects, such as the composition of a webpage using hypertext markup language (HTML) and plug-ins, e.g., scripts or other executable elements. The prepared content may also include advertising content, which may include content retrieved from other servers. The preparation of the content also includes the embedding of a swipe technology configuration 115 which establishes how the content will react to swipe gestures performed on the user device, as explained in further detail below. The content is then transmitted to the user device in the form of a content response 120.

The user device receives the content response sent by the hosting server and attaches the swipe technology 130 to an element of the content, such as, for example, an advertisement which overlays the content when it is displayed on the user device. The user device displays the content, e.g., on a touch screen, and awaits detection of a user touching the screen 135. Once a touch is detected, the user device begins to perform gesture input 140, i.e., touch data input and accumulation, which provides the basis for ascertaining whether the detected touch is in fact a swipe gesture by the user.

After the user stops touching the screen 145, the user device begins to interpret the detected gestures and apply the resulting actions 150. For example, if the touching of the screen is interpreted as a bona fide swipe gesture, then the overlaid advertising content may be removed from the display, e.g., the advertisement may be "swept" off of the content on which it is overlaid. Various other types of action may result from the swipe gesture. For example, the swipe gesture may initiate an animation or other executable aspect of the displayed content. After the resulting action, the user may then interact with the underlying, i.e., "non-swipe," content 155. If, on the other hand, the touching of the screen is not interpreted as a bona fide swipe gesture, then the user device will again await a user touching the screen 135.

Figure 2:
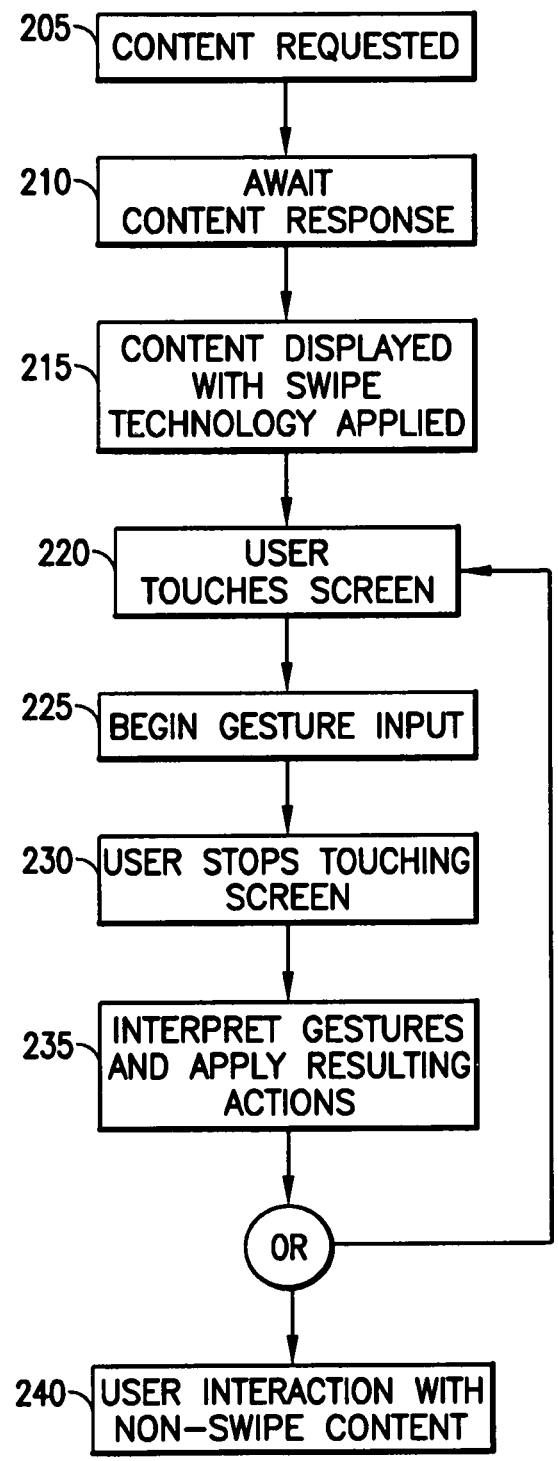
FIG. 2 is a flow chart of a method for performing swipe gesture recognition and content manipulation on a user device.

FIG. 2 depicts the method for performing swipe gesture recognition and content manipulation from the standpoint of the user device. As discussed above, the user device initiates a content request 205, which is transmitted to the hosting server. The user device then awaits a content response 210 from the hosting server. After the content is received, it is displayed with embedded swipe gesture recognition technology 215. The remainder of the steps performed by the user device to detect and recognize bona fide swipe gestures are as described above with respect to FIG. 1. These steps include: the user touching the screen 220, beginning gesture input 225, the user stops touching the screen 230, interpretation of the gestures and application of an action 235, and user interaction with non-swipe content 240.

Figure 3:
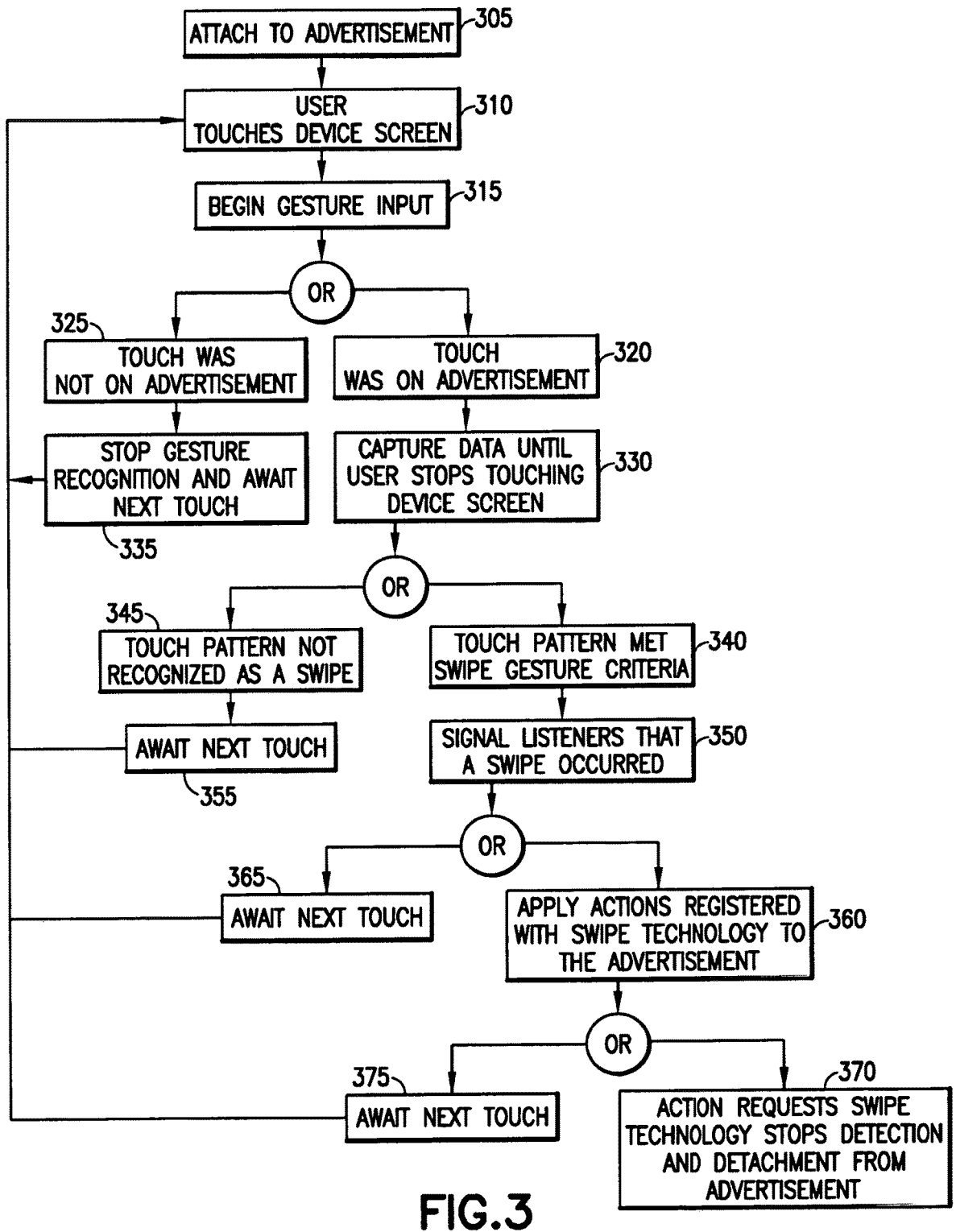
FIG. 3 is a flow chart of a method for performing swipe gesture recognition and content manipulation on a user device for an advertisement.

FIG. 3 depicts the method for performing swipe gesture recognition and content manipulation on a user device in the particular case of an advertisement overlaid on other displayed content, e.g., a webpage. As above, the user device received content from a hosting server to be displayed and attaches swipe gesture recognition to the content 305. The user device then awaits detection of a user touching the device screen 310. When a touch is detected, the user device begins to perform gesture input 315, i.e., touch data input and accumulation.

As part of the gesture input 315, the user device determines whether the touch was on the advertisement 320. In other words, it is determined whether the touch is within a defined start element, e.g., within an area defined by an advertisement "window" or other displayed graphical element. If so, then the user device continuously captures data regarding the screen touch 330, e.g., location and time data, until the user stops touching the screen. If, on the other hand, the touch is not determined to be on the advertisement 325, then the swipe gesture recognition is stopped 335 and the next user touch is awaited.

After the swipe gesture is completed, i.e., after the user stops touching the device 330, then an analysis is performed to determine whether the detected gesture is a bona fide swipe gesture. The analysis, as discussed in further detail below, involves the application of certain criteria to the touch data, e.g., location and time data, collected during the swipe detection. If it is determined that the touch data, i.e., touch "pattern," meets the applied criteria 340, then a signal is output to various applications which are "listening" for a swipe 350. If, on the other hand, the swipe gesture is not recognized as a swipe gesture 345, then the user device awaits the next touch 355.

If a bona fide swipe gesture is detected, then a defined action which is "registered" with the swipe technology attached to the advertisement is performed 360. For example, the registered action may be to close an overlaid advertisement window. The registered action may also involve the initiation of an animation or other executable element. The registered action may be implemented using various forms of software code, such as, for example, HTML-based scripts.

In certain embodiments, the detection of a swipe gesture may be signaled to listening applications, but any further action may be taken by the applications themselves, rather than by the swipe technology attached to the advertisement. For example, an advertisement may be part of displayed content which includes an executable element, e.g., a module written in Adobe Flash, and this element may handle the operation of removing the overlaid advertisement when the swipe gesture is signaled. In such a case, after the listeners are signaled that a swipe has occurred 350, then the attached swipe technology awaits the next touch 365 instead of performing an action.

If an action is applied by the attached swipe technology 360 following the detection of a swipe 350, then a step may be performed in which the swipe technology is detached from the advertisement and stops its swipe detection functions 370, or, alternatively, the swipe technology may continue swipe detection and await the next touch 375.

Figure 4A:
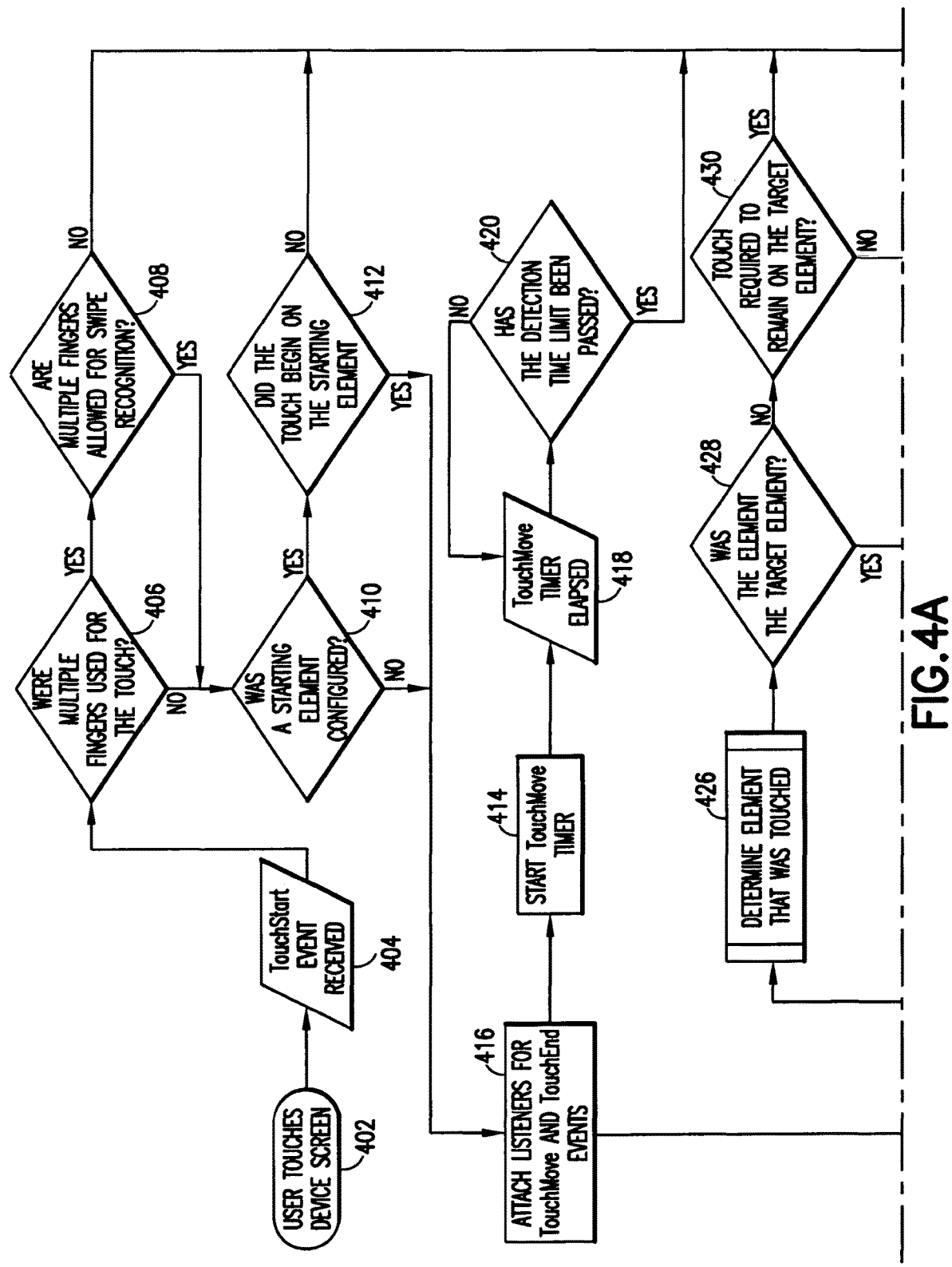
FIGS. 4A and 4B are a flow chart of a method for performing swipe gesture recognition on a user device.
Figure 4B:
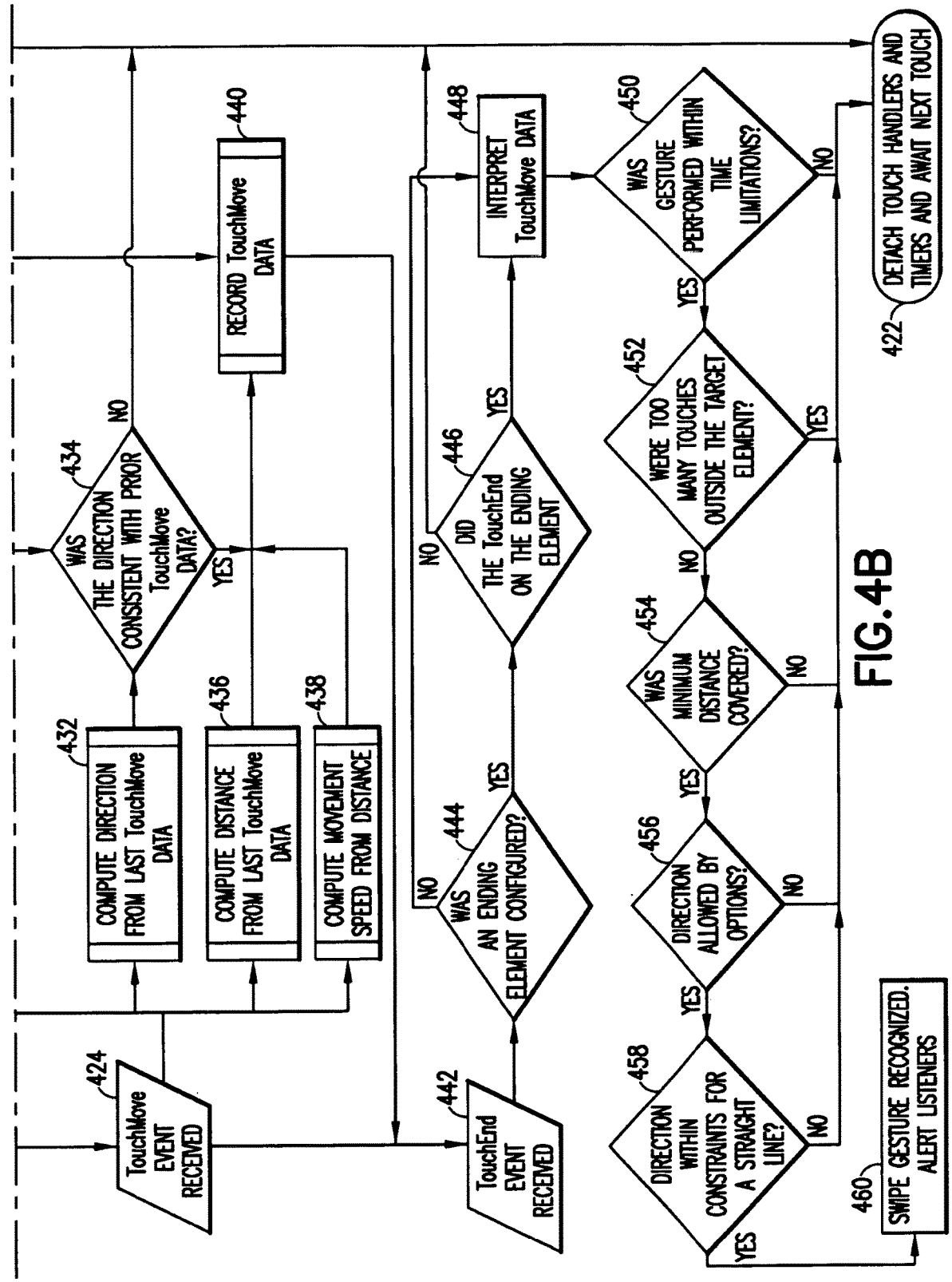

FIGS. 4A and 4B depict a method for performing swipe gesture recognition on a user device. As discussed above, swipe gesture recognition begins with a user touching the screen of the user device 402. This touching can be detected and signaled to the swipe gesture recognition technology by the conventional touch detection electronics of the user device. The detection of a touching of the screen may be referred to as a "touch start event" 404. Upon detection of the touch start event, a series of criteria are applied to the underlying touch data. The touch data may include, for example; location and time information regarding touched locations of the screen.

The first criteria applied to the touch data may be a determination of whether multiple fingers were used to touch the screen 406. This is followed by a determination of whether multiple-finger touches are allowed for swipe detection 408, which is a parameter which may be set based on defined preferences, e.g., preferences set by the content provider. If multiple-finger touches are not permitted in the particular configuration in question, the process then detaches the touch handlers and timers and awaits the next touch start event.

If multiple-finger swipe gestures are allowed, then the process determines whether there is a defined "starting element" 410, such as, for example, an overlaid advertisement having a defined area (e.g., a displayed window). If so, then the process determines whether the touch began within the boundaries of the starting element 412. If the touch began on the starting element (or if a starting element is not configured), then the process initiates a "touch move" event 414 and a "touch end" event listener 416, which are routines which detect the movement of a finger (or fingers) touching the screen and the end of the touching. These actions may be signaled by the conventional touch screen detection system of the user device. Alternatively, the touch move event may be detected based on processing of underlying touch location and time data.

After a touch start event is detected and the touch move and touch end listeners are attached, then a timer is initiated. If the elapsed time 418 exceeds a determined time limit 420 without a touch move event being detected, then the touch detection handlers and timers may be detached 422 and the process will await the next touch.

If, on the other hand, a touch move event is detected 424 before the time limit is exceeded, then a number of criteria are applied to the touch move data, as described in the following paragraphs.

The process determines whether any defined elements were touched during the touch move event 426. For example, a window defining an overlaid advertisement may be defined as a "target element." The process then determines whether an element touched during the movement is a target element 428. If the touched element is not a target element, then the process may detach the touch handlers and timers depending upon a parameter which defines whether the touch (i.e., the swipe gesture) is required to remain on a target element 430. If, on the other hand, the touched element is a target element, then there is no need for further processing in this branch of the process.

The process computes a direction of the touch movement 432 based on the location data and, in particular, the last touch move data. The process then determines whether the computed direction is consistent with prior touch move data 434. In other words, the process determines whether the swipe gesture is continuing in a single direction. The extent to which the movement is allowed to vary from a straight line or a particular direction (e.g., horizontally across the screen) may be established by setting parameters to desired values, e.g., based on preferences of the content provider or user. It should be noted that the direction criteria applied at this point in the process relates to a set of touch move data with respect to a preceding set of touch move data. It is used to filter out movements with directional changes from one data set to the next, e.g., one touch location to the next, which are too significant to allow the processing of the particular movement to continue. A further set of criteria may be applied to the swipe gesture as a whole, as discussed below.

The process also determines the distance from the last touch move data 436 and can compute the speed of the movement based on the computed distance 438. This allows various parameters to be applied, such as, for example, parameters which filter out swipe motions which are deemed to be too slow or too fast to be bona fide swipe gestures. Such parameters, as with all of the parameters discussed herein, may be set in advance based on preferences of a content provider, user, or system designer, or any combination thereof.

After the application of the various criteria discussed above to the touch move data, the touch move data is recorded 440. More specifically, the touch move data which is recorded may be a screen location along which the swipe gesture is being made by the user. The recording of the touch move data, as discussed above, is subject to the "filtering" by the applied criteria. This recording process continues as the user performs the swipe gesture until a touch end event is received 442, which means that the user has removed the user's finger (or fingers) from the touch screen.

After the touch end event is received, the process may determine whether an "ending element" was configured 444, which means that a particular element has been defined as an element upon which the swipe gesture must end 446. For example, if the swipe gesture is being made close an overlaid advertisement, then a parameter may be set which requires the entire swipe to be within the area (e.g., a displayed window) of the advertisement. If the touch end is not on the defined ending element, then the swipe gesture recognition process may terminate (i.e., the touch handlers and timers may be detached and the next touch will be awaited).

After the ending element criteria are applied, the touch move data, i.e., the data relating to most or all of the swipe gesture, are then interpreted 448 to determine whether the swipe gesture should be deemed bona fide. These criteria may include a determination of whether the swipe gesture was performed within a defined time limit 450. There may also be a determination of whether there are too many touch locations outside of the defined target element 452. There may be a determination of whether the swipe gesture covers a defined minimum distance 454 (e.g., whether the swipe gesture was long enough relative to the displayed content).

The swipe gesture criteria may also include a determination of whether swipe gesture was performed in a defined allowed direction 456, e.g., horizontally across the screen. The criteria may also include a determination of whether the line of movement is close enough to a straight line 458 to qualify as a bona fide swipe.

If the swipe gesture data meet all of the applied criteria then the swipe gesture is recognized and the "listener" applications are signaled that a swipe gesture has occurred 460.

The swipe gesture recognition technology (or, "swipe technology") for implementing the algorithms discussed above includes a set of "behaviors" which may be applied in a "stand-alone configuration" as well as bundled as part of a "swipe ad" or "swipe content" package. The term "behaviors" refers to the manner in which the user interface detects and responds to swipe gestures and other inputs initiated by the user via the user interface input mechanism, e.g., a touch screen, as implemented in object-oriented software.

In the stand-alone swipe technology configuration, behaviors are exposed, i.e., made available to a programmer, through a script, e.g., JavaScript, application programming interface (API). This allows the behaviors to be configured to interact with any elements of a web page, such as for example, overlaid or pop-up images to be displayed. The programmer may incorporate these behavioral elements into the code which is configured to present the content to the user. In such a case, the programmer will also include code, e.g., scripts, to handle the various types of detected behavior which can be received via the API.

The API is implemented via a set of JavaScript objects which are incorporated into the HTML code used to present content on the user device. The API also includes tags which reference external JavaScript files, which may reside on the hosting server and/or on a controlled public content delivery network (CDN). The external files implement, inter alia, the swipe gesture recognition algorithms discussed above in order to provide swipe gesture detection information via the JavaScript objects.

In the bundled configuration, both the behavioral elements and the detected behavior handling are bundled as part of swipe ad or swipe content package. In this configuration, the swipe ad package may be a modular system which includes tags for accessing external script files that define behaviors and actions to be taken in response to detected behaviors. Other functions may also be provided by the external files, such as, for example, functions relating to the manner in which the content is presented on the user device.

The bundled functions provided by the swipe ad or swipe content package allow the programmer creating the content to work primarily in HTML, while using JavaScript objects and external JavaScript references to present the content to the user with swipe gesture functionality. For example, content, such as an advertisement, may be included in an HTML file by using HTML tags (e.g., an anchor tag around an image tag). This tagged content may then be accessed by the swipe ad package to be displayed with swipe gesture functionality.

The JavaScript objects discussed below support the swipe gesture recognition technology behaviors by providing named sets of well-known, i.e., enumerated, values in logical groupings. The members of these objects may be referenced for use as values when interacting with the swipe gesture behavior API functions.

The following object provides enumerated values which define a degree to which a detected gesture must have a linear trajectory in order to be deemed a proper swipe gesture:
SoMo.Swipe.LineDetection
Strict
Even
Loose The following object provides well-known values which define a direction in which a detected gesture must be oriented in order to be deemed a proper swipe gesture:
SoMo.Swipe.Direction
Up
Down
Left
Right Swipe gesture detection functionality is exposed in the API in the form of two functions which work in concert to allow addition and removal of "observers" for the swipe gesture on a given page element, e.g., an overlaid or pop up image. When adding the swipe gesture observer, a set of options may be specified which allow control and fine tuning of the detection algorithm.

The usage of the observer-adding function is as follows:
SoMo.Swipe.addSwipeObserver
  targetElementId—(optional) The identifier of the document object model (DOM) element to which swipe gesture detection is to be applied. If not specified, then the current document is assumed.
  startElementId—(optional) The identifier of the DOM element on which the swipe gesture must begin in order to be deemed a proper swipe gesture. If not specified, then no constraint is applied.
  endElementId—(optional) The identifier of the DOM element on which the swipe gesture must end in order to be deemed a proper swipe gesture. If not specified, then no constraint is applied.
  ignoreSwipeElementIds—(optional) An array of DOM element identifiers that should not participate in swipe detection. These elements will not allow the touch events to be processed for swipe detection. Elements are typically specified for this option when primarily intended to receive another gesture, such as an advertisement image being clicked. If not specified, then swipe detection will be applied using normal event processing.
  allowMultipleFingers—(optional) A Boolean value that indicates if a swipe gesture may be performed with multiple fingers. If not specified, then false is assumed.
  maximumTouchesOffTarget—(optional) The total number of finger touches that are allowed to be outside of the target element for the gesture to still be considered a swipe. If not specified, then no constraint is applied.
  minimumDistanceVertical—(optional) The minimum distance, in pixels, that are required for a valid vertical swipe gesture. If not specified, then a distance of 50 pixels is assumed.
  minimumDistanceHorizontal—(optional) The minimum distance, in pixels, that are required for a valid horizontal swipe gesture. If not specified, then a distance of 50 pixels is assumed.
  maximumMoveInterval—(optional) The maximum amount of time, in milliseconds, that may elapse between figure movements in order to record a valid swipe gesture. If not specified, then an interval of 250 milliseconds is assumed.
  maximumGestureInterval—(optional) The maximum amount of time, in milliseconds, that may elapse between the beginning and ending touches of a gesture in order to be considered a swipe. If not specified, then an interval of 1250 milliseconds is assumed.
  lineDetection—(optional) The strictness of line detection that should be applied. This may take the form of a well-known value from the SoMo.Swipe. LineDetection object or a floating point percentage value that represents the tolerance factor to use when verifying that a gesture was linear. If not specified, the well-known LineDirection.Even value is assumed.
  allowedDirections—(optional) An array of directions in which a swipe gesture may be performed in order to be considered valid. The members of this array will take the form of a well-known value from the SoMo.Swipe.Direction object. If not specified, the four primary directions are assumed.
  swipeCallbacks—(optional) An array of functions to be invoked when a swipe gesture meeting the specified options is detected. The function is expected to have a signature of function(args), in which args will be an object containing the members: targetElement and direction where the values are the DOM element that the swipe gesture was observed and the direction of the gesture, respectively. The direction will be expressed as a well-known value from the SoMo.Swipe.Direction object.
Returns:

An object that represents the unique handle assigned to the swipe observer and the set of options being applied to gesture detection. This object must be passed to the removeSwipeObserver function in order to properly stop observing swipe gestures.

The following is an example of the use of the SoMo.Swipe.addSwipeObserver object:

```
var handle = SoMo.Swipe.addSwipeObserver(
{
    targetElementId        : 'myAdContainerId',
    ignoreSwipeElementIds  : ['myAdImageId'],
    lineDetection          : SoMo.Swipe.LineDetection.Loose,
    swipeCallbacks         : [function(args) { alert('swipe'); }]
});
var handle = SoMo.Swipe.addSwipeObserver(
{
    targetElementId          : 'santaImageId',
    startElementId           : 'santaHatId',
    endElementId             : 'santaBellyId',
    ignoreSwipeElementIds    : ['myAdImageId', 'someOtherId'],
    allowMultipleFingers     : true,
    maximumTouchesOffTarget  : 5,
    minimumDistanceVertical  : 100,
    minimumDistanceHorizontal: 65,
    maximumMoveInterval      : 200,
```

```
maximumGestureInterval    : 1100,
lineDetection             : SoMo.Swipe.LineDetection.Loose,
allowedDirections         : [SoMo.Swipe.Direction.Up]
swipeCallbacks            : [handleSwipe]
});
```

The usage of the observer-removing function is as follows:

removeSwipeObserver

Arguments: The set of options returned when addSwipeObserver was called. For example:

```
var handle = SoMo.Swipe.addSwipeObserver(options);
SoMo.Swipe.removeSwipeObserver(handle);
```

The following is a restatement of the object definitions given above in the form of a JavaScript interface definition or interface contact, which defines the structure for using the JavaScript objects. The definition includes enumerations of certain values to be used as arguments of the objects, e.g., for line detection and direction.

```
var SoMo = SoMo ||{ };
// Swipe Behaviors
/**
 * A static class providing the public interface for swipe ad
functionality.
 * @class
 */
SoMo.Swipe =
{
    /**
     * Adds an observer to be alerted when a swipe gesture is detected.
     * @member Swipe
     *
     * @param options {object} A set of options for controlling swipe
detection behavior. The allowed options are:
     *      targetElementId          {string}     [OPTIONAL] Id of the
DOM element that swipe detection is applied to. If not specified, the
screen is used
     *      startElementId           {string}     [OPTIONAL] Id of the
DOM element that the swipe gesture must begin on. If not specified, no
constraint is applied
     *      endElementId             {string}     [OPTIONAL] Id of the
DOM element that the swipe gesture must end on. If not specified, no
constraint is applied
     *      ignoreSwipeElementIds    {array}      [OPTIONAL] A set of
DOM element ids that should not participate in swipe detection. These
elements will not allow the touch events to bubble. If not specified,
swipe detection will be applied using normal event bubbling
     *      allowMultipleFingers     {boolean}    [OPTIONAL] True if
gestures with multiple fingers are eligible to be considered swipe
gestures. If not specified, false is assumed
     *      maximumTouchesOffTarget  {int}        [OPTIONAL] The total
number of touches that are allowed to occur on an element that is not the
target. If not specified, no constraint is applied
     *      minimumDistanceVertical  {int}        [OPTIONAL] The
minimum distance, in pixels, that are required for a vertical swipe
gesture. If not specified, a reasonable default is applied
     *      minimumDistanceHorizontal {int}       [OPTIONAL] The
minimum distance, in pixels, that are required for a hoizontal swipe
gesture. If not specified, a reasonable default is applied
     *      maximumMoveInterval      {int}        [OPTIONAL] The
maximum amount of time, in milliseconds, that may elapse between finger
movements. If not specified, a reasonable default is applied
     *      maximumGestureInterval   {int}        [OPTIONAL] The
maximum amount of time, in milliseconds, that performing the gesture is
allowed to take. If not specified, a reasonable default is applied
     *      lineDetection            {int|float}  [OPTIONAL] The type
of line detection strictness that should be applied. If not specified, a
reasonable default is applied
     *      allowedDirections        {array}      [OPTIONAL] The set of
directions in which a swipe gesture is valid. If not applied, the four
primary directions are allowed
     *      swipeCallbacks           {array}      [OPTIONAL] The set of
callback functions to alert when a swipe gesture is detected. If not
specified, no notification is performed
     *
     * @returns {object} The set of options received normalized with the
default values for unspecified members
     */
    addSwipeObserver : function Swipe$addSwipeObserver(options) { },
    /**
     * Removes a swipe observer.
     * @member Swipe
     *
```

```
    * @param options {object} The set of options received as a return
value when the swipe observer was added.
    */
    removeSwipeObserver : function Swipe$removeSwipeObserver(options) { }
};
// Line Detection
SoMo.Swipe.LineDetection =
{
  Strict : 0,
  Loose : 2,
  Even : 4
};
// Direction
SoMo.Swipe.Direction =
{
  Up : 0,
  Down : 2,
  Left : 4,
  Right : 8
};
```

The following is an example of the swipe behaviors reference, as it would appear in an HTML page:

```
<script type="text/javascript" src="http://ef2083a34f0ec9f817e8-
64e501cf4fb3a4a144bedf4c4ec2f5da.r2.cf2.rackcdn.com/static/swipe-
ads/somo-swipe-behaviors.js"></script>
```

The following is an example of a swipe content unit (e.g., an advertisement unit) being included in an HTML page:

```
<script type="text/javascript">
        window.SwipeAdState =
            {
                Normal         : 0,
                AdOnly         : 2,
                DoNotDisplay   : 4,
                AwaitCallback  : 8
            };
        window.currentSwipeAdId  = 'swipeAd9876789';
        window.swipeState        = window.SwipeAdState.Normal;
        window.swipeQueue        = window.swipeQueue || [ ];
        window.swipeQueue.push(window.currentSwipeAdId);
    </script>
    <div style="display:none; position:absolute; top:–3000px;
left:–3000px; z-index:–9999;" id="adWrapper123454321">
        <!-- AD CREATIVE -->
        <a
href="http://www.giftcards.com/?utm_source=swipe&utm_
medium=mobile&utm_campaign=728x90"
target="_blank"><img src="http://www.swipeadvertising.com/ads/
tablet-728x90.png"
height="90" width="728" alt="Ad Content" /></a>
        <!-- END AD CREATIVE -->
    </div>
    <script type="text/javascript" src="http://ef2083a34f0ec9f817e8-
64e501cf4fb3a4a144bedf4c4ec2f5da.r2.cf2.rackcdn.com/static/swipe-ads/
somo-bottom-728x90-close.js"></script>
ifferent techniques or commands, alt      (function(undefined)
        (function(undefined)
            {
                var wrapperId  = 'adWrapper123454321';
                var id         = window.currentSwipeAdId;
                delete window.currentSwipeAdId;
                var initialize = (function(id, wrapperId)
                {
                    return function( ) { SoMo.SwipeAds.initializeAd[id](id,
                        wrapperId); };
                })(id, wrapperId);
                if (window.swipeState ===
                    window.SwipeAdState.AwaitCallback)
                {
                    SoMo.SwipeAds.addSwipeAdCompleteCallback(id,
                        initialize);
                    window.swipeState = window.SwipeAdState.Normal;
                }
                else
                {
                    SoMo.DOMReady.add(initialize);
                }
        })( );
    </script>
```

Although example embodiments have been shown and described in this specification and figures, it would be appreciated by those skilled in the art that changes may be made to the illustrated and/or described example embodiments without departing from their principles and spirit.

What is claimed is:

1. A method for providing a user interface for a touch-screen of a mobile device, the method comprising:
    receiving from an application running on a processor of the mobile device, via a network, a request for content;
    combining the requested content with a swipe gesture application programming interface to form a content package, wherein the swipe gesture application programming interface is associated in the content package with at least one displayable element referenced by a first identifier and a webpage referenced by a second identifier, and the swipe gesture application programming interface including a reference to a swipe behavior library; and
    sending the content package via the network to the application running on the mobile device,
    wherein the swipe gesture application programming interface comprises code which performs swipe gesture recognition while the at least one displayable element is displayed on the mobile device by the application, the swipe gesture recognition comprising:
        waiting for detection of a touch start event,
        collecting touch input data from the touchscreen of the mobile device after the touch start event is detected until a touch end event is detected, and
        determining whether a swipe gesture has occurred based on analysis of the collected touch input data, wherein the determining is based at least in part on a movement between a touch start location and a touch end location of the collected touch input data, the touch start location and the touch end location, being different locations;

initiating navigation to the webpage, based on the second identifier, if the determining indicates that a swipe gesture has occurred; and initiating an operation other than navigation to the webpage, if the determining indicates that a touch other than a swipe gesture has occurred.

2. The method of claim 1, wherein said determining whether a swipe gesture has occurred is based in part on a direction of the swipe.

3. The method of claim 1, wherein the at least one displayable content element is in the form of a window overlaid on other displayed content.

4. The method of claim 1, wherein the at least one displayable content element is in the form of a full screen window.

5. The method of claim 1, wherein the swipe gesture application programming interface comprises script objects.

6. The method of claim 1, wherein the swipe gesture application programming interface comprises code for controlling the touch display based at least in part on a result of said determining whether a swipe gesture has occurred.

7. A non-transitory storage medium storing instructions for causing a processor to perform a method for manipulation of content provided by a hosting server using swipe gesture recognition on a user device having a touch input display, the method comprising:

receiving from an application running on a processor of the mobile device, via a network, a request for content;

combining the requested content with a swipe gesture application programming interface to form a content package, wherein the swipe gesture application programming interface is associated in the content package with at least one displayable element referenced by a first identifier and a webpage referenced by a second identifier, and the swipe gesture application programming interface including a reference to a swipe behavior library; and sending the content package via the network to the application running on the mobile device, wherein the swipe gesture application programming interface comprises code which performs swipe gesture recognition while the at least one displayable element is displayed on the mobile device by the application, the swipe gesture recognition comprising:

waiting for detection of a touch start event, collecting touch input data from the touchscreen of the mobile device after the touch start event is detected until a touch end event is detected, and determining whether a swipe gesture has occurred based on analysis of the collected touch input data, wherein the determining is based at least in part on a movement between a touch start location and a touch end location of the collected touch input data, the touch start location and the touch end location, being different locations;

initiating navigation to the webpage, based on the second identifier, if the determining indicates that a swipe gesture has occurred; and initiating an operation other than navigation to the webpage, if the determining indicates that a touch other than a swipe gesture has occurred.

8. The non-transitory storage medium of claim 7, wherein said determining whether a swipe gesture has occurred is based in part on a direction of the swipe.

9. The non-transitory storage medium of claim 7, wherein the at least one displayable content element is in the form of a window overlaid on other displayed content.

10. The non-transitory storage medium of claim 7, wherein the at least one displayable content element is in the form of a full screen window.

11. The non-transitory storage medium of claim 7, wherein the swipe gesture application programming interface comprises script objects.

12. The non-transitory storage medium of claim 7, wherein the swipe gesture application programming interface comprises code for controlling the touch display based at least in part on a result of said determining whether a swipe gesture has occurred.

* * * * *